US009684970B2

(12) United States Patent
Mendez Mendez et al.

(10) Patent No.: US 9,684,970 B2
(45) Date of Patent: Jun. 20, 2017

(54) FAST ADAPTIVE ESTIMATION OF MOTION BLUR FOR COHERENT RENDERING

(71) Applicant: QUALCOMM Incorporated, San Diego, CA (US)

(72) Inventors: Erick Mendez Mendez, Vienna (AT); Kiyoung Kim, Vienna (AT); Youngmin Park, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 14/633,737

(22) Filed: Feb. 27, 2015

(65) Prior Publication Data

US 2016/0253819 A1 Sep. 1, 2016

(51) Int. Cl.
*G06K 9/48* (2006.01)
*G06T 7/20* (2017.01)
(Continued)

(52) U.S. Cl.
CPC .......... *G06T 7/20* (2013.01); *G06K 9/48* (2013.01); *G06T 5/003* (2013.01); *G06T 13/80* (2013.01);
(Continued)

(58) Field of Classification Search
CPC . G06T 2207/20201; G06T 5/003; G06T 7/20; G06T 2207/10016; G06T 5/002;
(Continued)

(56) References Cited

U.S. PATENT DOCUMENTS 8,649,626 B2 * 2/2014 Tsutsumi ............... G06T 5/003
348/208.1
8,675,045 B2 * 3/2014 Marin ................. G02B 27/017
348/42
(Continued)

FOREIGN PATENT DOCUMENTS

EP 3092790 A1 * 11/2016

OTHER PUBLICATIONS

Fischer J., et al., "Enhanced Visual Realism by Incorporating Camera Image Effects", Mixed and Augmented Reality, 2006, ISMAR 2006, IEEE/ACM International Symposium on, Oct. 2006 (Oct. 2006), pp. 205-208, XP058033330, DOI: 10.1109/ISMAR2006.297815 ISBN: 978-1-4244-0650-0.
(Continued)

*Primary Examiner* — Vu Le
*Assistant Examiner* — Aklilu Woldemariam
(74) *Attorney, Agent, or Firm* — Blakely, Sokoloff, Taylor & Zafman

(57) ABSTRACT

Disclosed is a method and apparatus for adaptively executing one or more motion blur estimation methods to estimate a motion blur associated with an image target frame in an Augmented Reality environment produced by an Augmented Reality application. In one embodiment, the functions implemented include: applying a first motion blur estimation method to estimate the motion blur; determining whether computational resources are available for a second motion blur estimation method; and applying the second motion blur estimation method to estimate the motion blur in response to a determination that computational resources are available for the second motion blur estimation method.

30 Claims, 7 Drawing Sheets

(51) Int. Cl.
*G06T 5/00* (2006.01)
*G06T 19/00* (2011.01)
*G06T 13/80* (2011.01)

(52) U.S. Cl.
CPC .. *G06T 19/006* (2013.01); *G06T 2207/20016* (2013.01); *G06T 2215/16* (2013.01)

(58) Field of Classification Search
CPC ........... G06T 2207/20012; G06T 17/00; G06T 2207/10021; G06T 7/74; G06T 13/80; G06T 19/006; G06T 2207/20016; G06T 2215/16; G01C 11/06; G01C 3/32; G02B 7/38; H04N 5/23254; H04N 5/23267; H04N 5/2355; H04N 5/145; H04N 19/51; H04N 19/53; H04N 19/85; H04N 5/23277; H04N 19/44; H04N 19/527; H04N 5/144; H04N 5/21; H04N 5/23264; H04N 19/503; G08B 13/1961; G09G 2320/106; G09G 2320/0252; G09G 2320/0285; G09G 5/393; G09G 2320/0266; G09G 3/2022; G06K 9/2081; G06K 9/228; G06K 9/3241; G06K 9/3258; G06K 9/48
USPC ....... 382/106, 197, 255, 300, 225, 254, 260; 348/42, 208
See application file for complete search history.

(56) References Cited

U.S. PATENT DOCUMENTS

| | | | |
|---|---|---|---|
| 9,036,898 B1* | 5/2015 | Beeler | G06T 19/20 382/154 |
| 2004/0258154 A1 | 12/2004 | Liu et al. | |
| 2006/0153472 A1* | 7/2006 | Sakata | H04N 5/23248 382/255 |
| 2006/0280249 A1* | 12/2006 | Poon | G06T 5/50 375/240.16 |
| 2008/0170124 A1* | 7/2008 | Hatanaka | G06T 5/004 348/208.4 |
| 2008/0175507 A1 | 7/2008 | Lookingbill et al. | |
| 2008/0175508 A1* | 7/2008 | Bando | G06T 5/003 382/255 |
| 2008/0232707 A1* | 9/2008 | Lee | G06T 5/003 382/255 |
| 2008/0253676 A1* | 10/2008 | Oh | H04N 5/23248 382/255 |
| 2009/0067509 A1* | 3/2009 | Poon | G09G 3/3648 375/240.26 |
| 2009/0079836 A1* | 3/2009 | Mishima | G06T 3/4007 348/208.4 |
| 2009/0110303 A1* | 4/2009 | Nishiyama | G06K 9/00228 382/225 |
| 2009/0316009 A1* | 12/2009 | Ito | H04N 5/235 348/208.4 |
| 2011/0033130 A1* | 2/2011 | Poon | G06T 5/003 382/255 |
| 2011/0033132 A1* | 2/2011 | Ishii | G06T 5/003 382/275 |
| 2011/0096180 A1* | 4/2011 | McCloskey | G06T 5/003 348/208.4 |
| 2012/0120071 A1 | 5/2012 | Thorn | |
| 2012/0300025 A1 | 11/2012 | Tchoukaleysky | |
| 2013/0057714 A1* | 3/2013 | Ishii | H04N 5/23248 348/208.4 |
| 2013/0113950 A1* | 5/2013 | Park | G06T 5/50 348/208.4 |
| 2013/0121537 A1* | 5/2013 | Monobe | H04N 5/23254 382/106 |
| 2014/0270348 A1 | 9/2014 | Wagner et al. | |
| 2015/0054955 A1* | 2/2015 | Lim | B60R 1/00 348/148 |
| 2015/0084991 A1* | 3/2015 | Schutz | G06T 5/50 345/647 |
| 2015/0294186 A1* | 10/2015 | Ali | G06K 9/40 382/199 |
| 2016/0006935 A1* | 1/2016 | Zhou | H04N 5/23254 348/208.1 |

OTHER PUBLICATIONS

International Search Report and Written Opinion—PCT/US2016/015462 ISA/EPO—Apr. 26, 2016.

Kumar S. et al., "Global motion estimation in frequency and spatial domain," Acoustics, Speech, and Signal Processing, 2004. Proceedings. (ICASSP '04). IEEE International Conferenceon Montreal, Quebec, Canada May 17-21, 2004, Piscataway, NJ, USA, IEEE, vol. 3 May 17, 2004, pp. 333-336.

Park Y., et al., "Handling Motion-Blur in 3D Tracking and Rendering for Augmented Reality", IEEE Transactions on Visualization and Computer Graphics, IEEE Service Center, Los Alamitos, CA, US, vol. 18, No. 9, Sep. 1, 2012 (Sep. 1, 2012), pp. 1449-1459, XP011490455, ISSN: 1077-2626, DOI: 10.1109/TVCG.2011.158.

Walker A.B., "Hard Real-Time Motion Planning for Autonomous Vehicles", Australasian Digital Theses collection, Nov. 1, 2011 (Nov. 1, 2011), XP055264112, Retrieved from the Internet: URL:http://hdl.handle.net/1959.3/211272 [retrieved on Apr. 11, 2016].

Okumura B., et al., "Augmented reality based on estimation of defocusing and motion blurring from captured images," IEEE/ACM International Symposium on Mixed and Augmented Reality (ISMAR), 2006, pp. 219-225.

* cited by examiner

FAST ADAPTIVE ESTIMATION OF MOTION BLUR FOR COHERENT RENDERING

FIELD

The subject matter disclosed herein relates to electronic devices and, more particularly, to methods and apparatuses for use with Augmented Reality environments implemented by electronic devices.

BACKGROUND

With the Augmented Reality technology, a visible virtual object may be superimposed on a video feed of a real-world scene such that in the output video feed, the virtual object appears to be part of the real-world scene. Multiple known techniques may be used to make the virtual object appear realistically as part of the real-world scene. For example, the camera pose may be tracked from one frame of the video feed to another with known techniques such that the pose of the virtual object may be adjusted accordingly to make the virtual object appear as part of the real-world scene.

In situations where the video feed depicting a real-world scene becomes blurred as a result of fast camera movement, the realism of the virtual object may diminish if the virtual object is not similarly blurred. Therefore, methods for measuring motion blurs of the video feed depicting the real-world scene on which the virtual object is superimposed and methods for adjusting the virtual object to simulate a corresponding blur are useful.

SUMMARY

An embodiment disclosed herein may include a method for adaptively applying one or more motion blur estimation methods to estimate a motion blur associated with an image target frame, comprising: applying a first motion blur estimation method to estimate the motion blur; determining whether computational resources are available for a second motion blur estimation method; and applying the second motion blur estimation method to estimate the motion blur in response to a determination that computational resources are available for the second motion blur estimation method.

Another embodiment disclosed herein may include an apparatus for adaptively applying one or more motion blur estimation methods to estimate a motion blur associated with an image target frame, comprising: a memory; and a processor configured to: apply a first motion blur estimation method to estimate the motion blur, determine whether computational resources are available for a second motion blur estimation method, and apply the second motion blur estimation method to estimate the motion blur in response to a determination that computational resources are available for the second motion blur estimation method.

A further embodiment disclosed herein may include an apparatus for adaptively applying one or more motion blur estimation methods to estimate a motion blur associated with an image target frame, comprising: means for applying a first motion blur estimation method to estimate the motion blur; means for determining whether computational resources are available for a second motion blur estimation method; and means for applying the second motion blur estimation method to estimate the motion blur in response to a determination that computational resources are available for the second motion blur estimation method.

An additional embodiment disclosed herein may include a non-transitory computer-readable medium including code which, when executed by a processor, causes the processor to perform a method comprising: applying a first motion blur estimation method to estimate a motion blur associated with an image target frame; determining whether computational resources are available for a second motion blur estimation method; and applying the second motion blur estimation method to estimate the motion blur in response to a determination that computational resources are available for the second motion blur estimation method.

DETAILED DESCRIPTION

Figure 1:
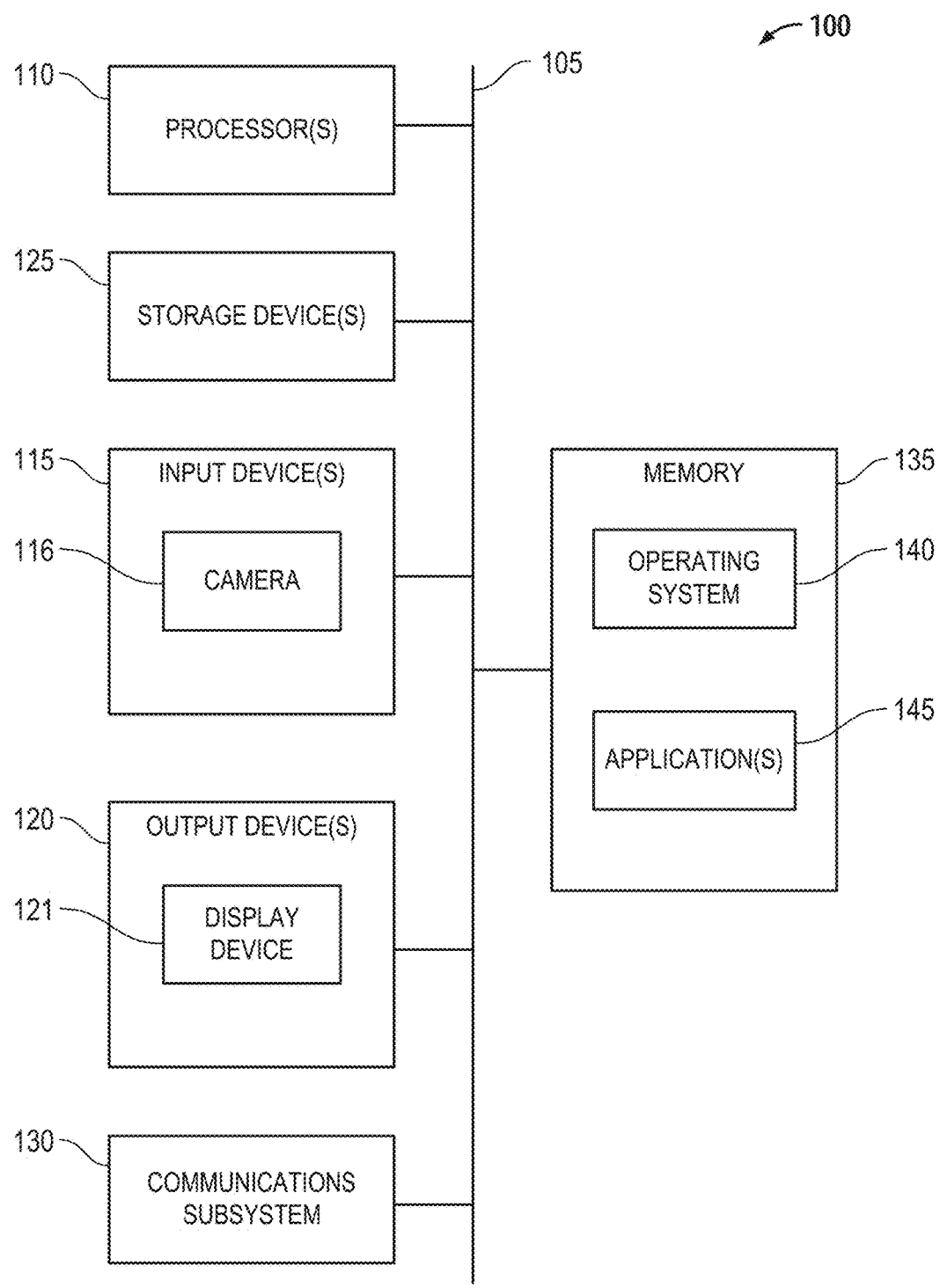
FIG. 1 illustrates an embodiment of a device adapted for Augmented Reality applications.

An example device 100 adapted for Augmented Reality applications is illustrated in FIG. 1. The device as used herein (e.g., device 100) may be a: mobile device, wireless device, cell phone, personal digital assistant, mobile computer, wearable device (e.g., watch, head mounted display, virtual reality glasses, etc.), tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, the device 100 may include a radio device, a cellular telephone device, a computing device, a personal communication system device, or other like movable wireless communication equipped device, appliance, or machine.

The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which include without limitation a camera 116, a mouse, a keyboard, keypad, touch-screen, microphone and/or or the like; and one or more output devices 120, which include without limitation a display device 121, a speaker, a printer, and/or the like.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other devices, and/or any other devices described herein. In one embodiment, the device 100 may further comprise a memory 135, which can include a RAM or ROM device, as described above. It should be appreciated that device 100 may be a mobile device or a non-mobile device, and may have wireless and/or wired connections.

The device 100 may also comprise software elements, shown as being currently located within the working memory 135, including an operating system 140, device drivers, executable libraries, and/or other code, such as one or more application programs 145, which may comprise or may be designed to implement methods, and/or configure systems, provided by embodiments, as will be described herein. Merely by way of example, one or more procedures described with respect to the method(s) discussed below might be implemented as code and/or instructions executable by device 100 (and/or a processor 110 within device 100); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a device, such as the device 100. In other embodiments, the storage medium might be separate from a device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

Application programs 145 may include one or more Augmented Reality applications. An example Augmented Reality application is capable of recognizing and tracking image targets in real time. In one exemplary embodiment, the example Augmented Reality application tracks image targets using a plurality of keypoints on the image targets. It should be appreciated that the functionality of the Augmented Reality application described hereinafter may be alternatively implemented in hardware or different levels of software, such as an operating system (OS), a firmware, a computer vision module, etc.

In one embodiment, image targets, representing a real world scene, are frames of a live video feed received from the camera 116 of the device 100. The video feed may be buffered. In another embodiment, the video feed may be a pre-recorded video feed and may be retrieved from a storage medium. The Augmented Reality application 145 may superimpose one or more virtual objects on the image targets. The image targets, on which the one or more virtual objects are superimposed, are then rendered frame-by-frame on the display device 121. Because the example Augmented Reality application tracks the position and orientation of the image targets and adjusts the position and orientation of the superimposed one or more virtual objects accordingly, a user's perspective on the one or more virtual objects corresponds with his or her perspective on the image targets, and as a result, it appears to the user that the one or more virtual objects are a part of the real world scene. Also, in one embodiment, the image targets that represent the real world scene may be frames of a saved video feed.

Figure 2A:
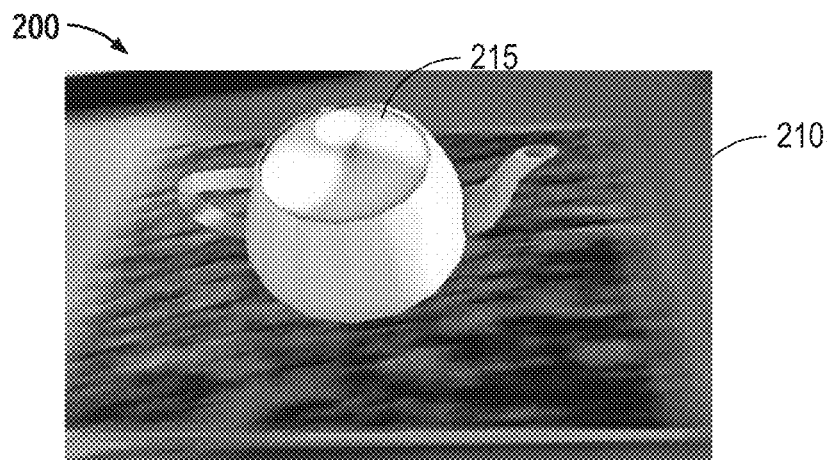
FIGS. 2A and 2B illustrate outputs of an exemplary Augmented Reality application.
Figure 2B:
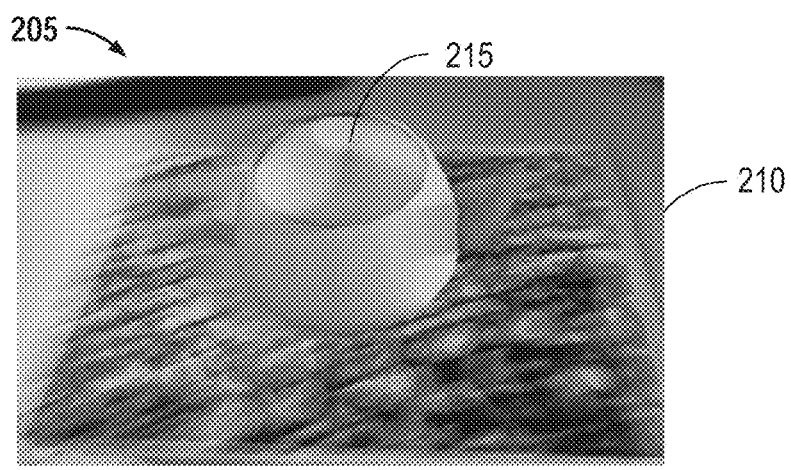

Referring to FIGS. 2A and 2B, outputs 200 and 205 of an exemplary Augmented Reality application 145 are shown. In FIG. 2A, it can be seen that the image target 210 is blurred due to fast camera movements. However, the virtual object—the virtual teapot 215—is not blurred accordingly. As a result, the realism of the virtual teapot 215 diminishes and the virtual teapot 215 appears less to be part of the real-world scene depicted in the image target 210. In contrast, in FIG. 2B, which shows the same blurred image target 210, the virtual teapot 215 is adjusted to appear to have been subjected to the same motion blur. As a result, the virtual teapot 215 of FIG. 2B appears more realistically as part of the real-world scene depicted in the image target 210.

It should be appreciated that to simulate a motion blur on a virtual object, certain information relating to the motion blur of the image target may be required. For example, a motion blur of an image target may be represented by a blur vector comprising a direction and a magnitude. Alternatively, a motion blur of an image target may be represented by the combination of an intermediate camera pose between the camera pose of the image target frame in question and the camera pose of the image target frame directly before it at which the motion blur starts to occur and a blur amount. Hereinafter the intermediate camera pose described above may be referred to as the critical pose. In other words, a motion blur of an image target may be represented by the combination of a critical pose and a blur amount.

Three methods for estimating a motion blur of an image target are described hereinafter. The three methods may be referred to as the first motion blur estimation method, the second motion blur estimation method, and the third motion blur estimation method. Alternatively, the first motion blur estimation method may be referred to as Fast 2D Estimation; the second motion blur estimation method may be referred to as Coarse 3D Estimation; and the third motion blur estimation method may be referred to as Refined 3D Estimation. As will be explained in detail below, the third motion blur estimation method (Refined 3D Estimation) is more computationally intensive than the second motion blur estimation method (Coarse 3D Estimation), which in turn is more computationally intensive than the first motion blur estimation method (Fast 2D Estimation).

Figure 3:
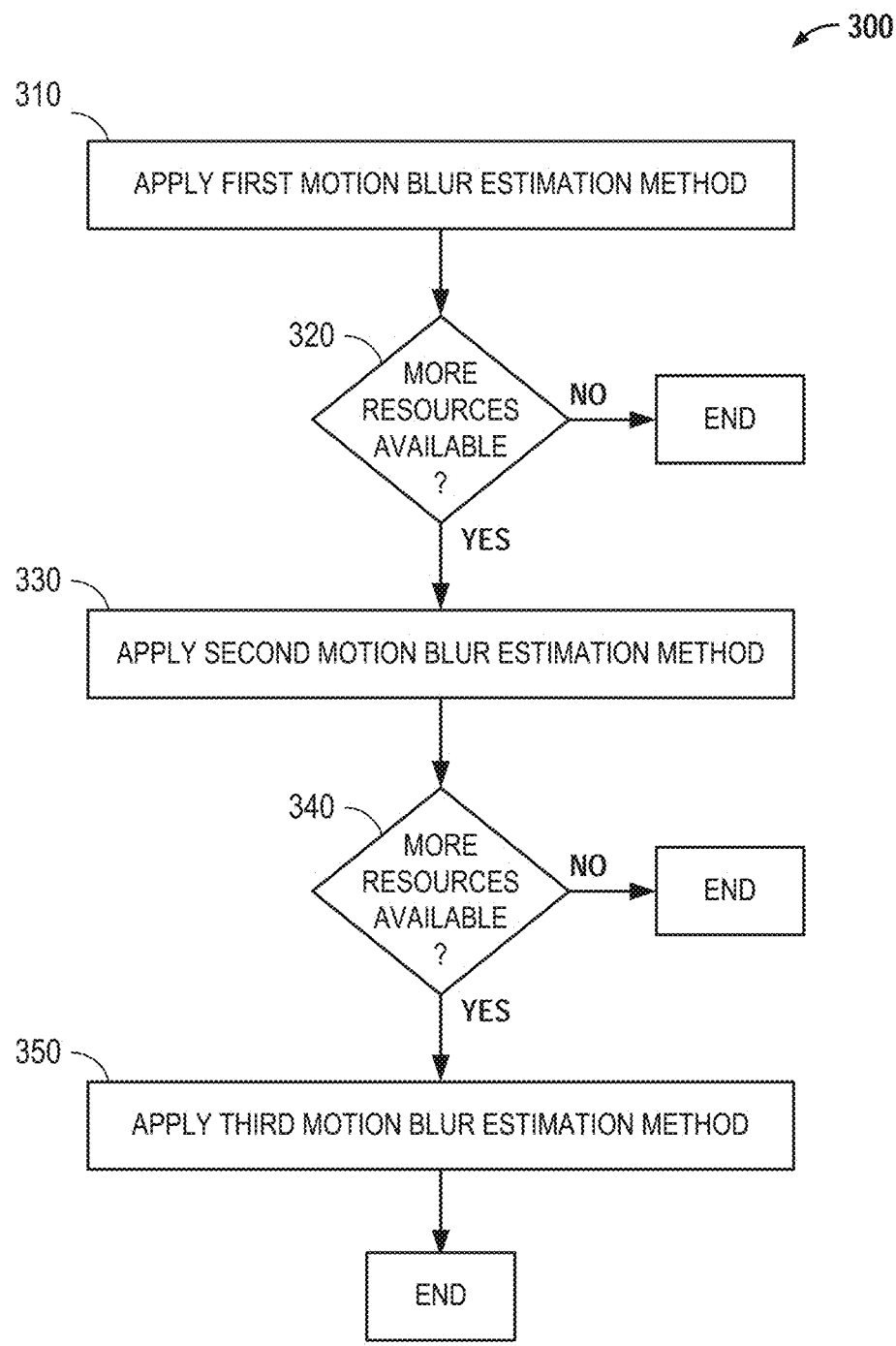
FIG. 3 is a flowchart illustrating an exemplary method for adaptively applying one or more methods for estimating a motion blur of an image target.

Referring to FIG. 3, a flowchart illustrating an exemplary method 300 for adaptively applying one or more methods for estimating a motion blur of an image target is shown. At block 310, the first motion blur estimation method may be applied to estimate the motion blur. The first motion blur estimation method may be the exemplary first motion blur estimation method 400 of FIG. 4, which will be described in detail below. At block 320, a determination may be made whether computational resources are available for the second motion blur estimation method. The computational resources may include, for example, remaining budgeted time, or available memory space. If it is determined at block 320 that there are not sufficient computational resources available for the second motion blur estimation method, the method 300 may terminate. If it is determined at block 320 that computational resources are available for the second motion blur estimation method, the method 300 proceeds to block 330, where the second motion blur estimation method may be applied to estimate the motion blur in response to the determination that computational resources are available for the second motion blur estimation method. The second motion blur estimation method may be the exemplary motion blur estimation second motion blur estimation method 500 of FIG. 5, which will be described in detail below. Next, at block 340, a determination may be made whether computational resources are available for the third motion blur estimation method. If it is determined at block 340 that there are not sufficient computational resources available for the third motion blur estimation method, the method 300 may terminate. If it is determined at block 340 that computational resources are available for the third motion blur estimation method, the method 300 proceeds to block 350, where the third motion blur estimation method may be applied to estimate the motion blur in response to the determination that computational resources are available for the third motion blur estimation method. The third motion blur estimation method may be the exemplary third motion blur estimation method 700 of FIG. 7, which will be described in detail below. Afterwards, the method 300 may terminate. The method 300 may be executed for each image target frame to generate one or more motion blur estimations for the image target frame. Alternatively, the method 300 may be executed from time to time to select the most suitable motion blur estimation method under the circumstances, and the motion blur estimation method may be used for multiple image target frames until the method 300 is executed next time. The most suitable motion blur estimation method may be the one that provides the most accurate motion blur estimate given the resource constraints.

In an alternative embodiment, a method that determines the most suitable motion blur estimation method based on available computational resources and estimated computational resources required for each motion blur estimation method without first performing a particular motion blur estimation method may be utilized.

Of course, in some embodiments where the computational resources profile is known for the device and the circumstances, the most suitable motion blur estimation method may be selected without utilizing the method 300.

Figure 4:
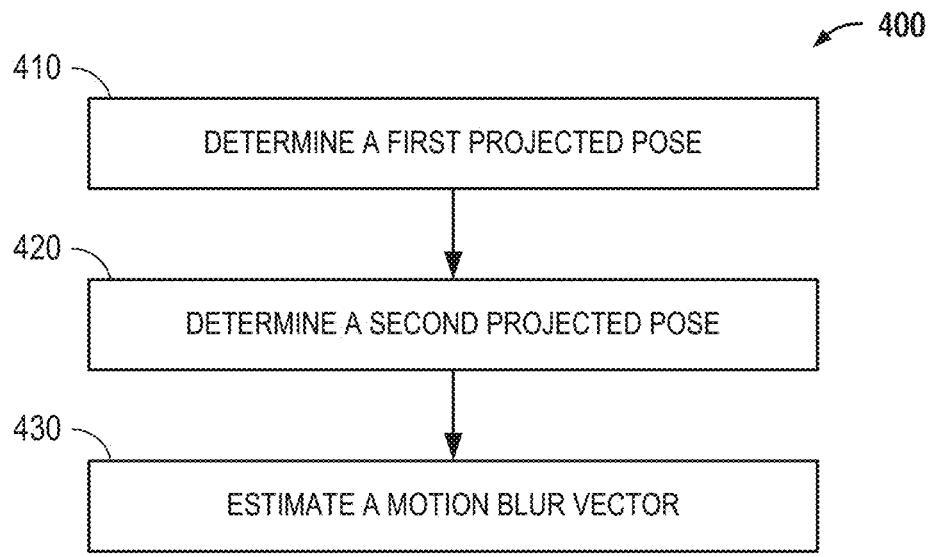
FIG. 4 is a flowchart illustrating an exemplary first motion blur estimation method for estimating a motion blur of an image target.

Referring to FIG. 4, a flowchart illustrating an exemplary first motion blur estimation method 400 for estimating a motion blur of an image target is shown. The first motion blur estimation method 400 may be referred to alternatively as Fast 2D Estimation. At block 410, a first projected pose may be determined by measuring a pose of the image target frame in question and projecting the pose of the image target frame in question to screen space. At block 420, a second projected pose may be determined by measuring a pose of the image target frame directly before the image target frame in question and projecting the pose of the image target frame directly before the image target frame in question to screen space. Afterwards, at block 430, a motion blur vector of the image target frame in question may be determined based at least in part on the difference between the second projected pose and the first projected pose. The position(s) used in the calculation at block 430 may be one single position, such as the center position, or may be multiple positions, such as the corners of the image target frames. It should be appreciated that differences between previous pairs of successive image target frames (as projected to screen space) may be used to determine the motion blur vector of the current image target frame on an extrapolated curve, so that the result of the motion blur estimation for the current image target frame may be based on a plurality of previous pairs of successive image target frames.

The first motion blur estimation method 400 may be utilized during runtime for a fast 2D estimation of the motion blur of one or more image target frames. Furthermore, the first motion blur estimation method 400 may be used with such methods as Simultaneous Localization and Mapping (SLAM), or User-Defined Target (UDT). It should be appreciated, however, that the vector derived at block 430 is a motion vector that does not truly measure the camera blur. Under certain circumstances fast camera movements do not necessarily lead to blurs, and using the motion vector derived at block 430 as a blur vector to adjust the virtual object may result in erroneous results.

Figure 5:
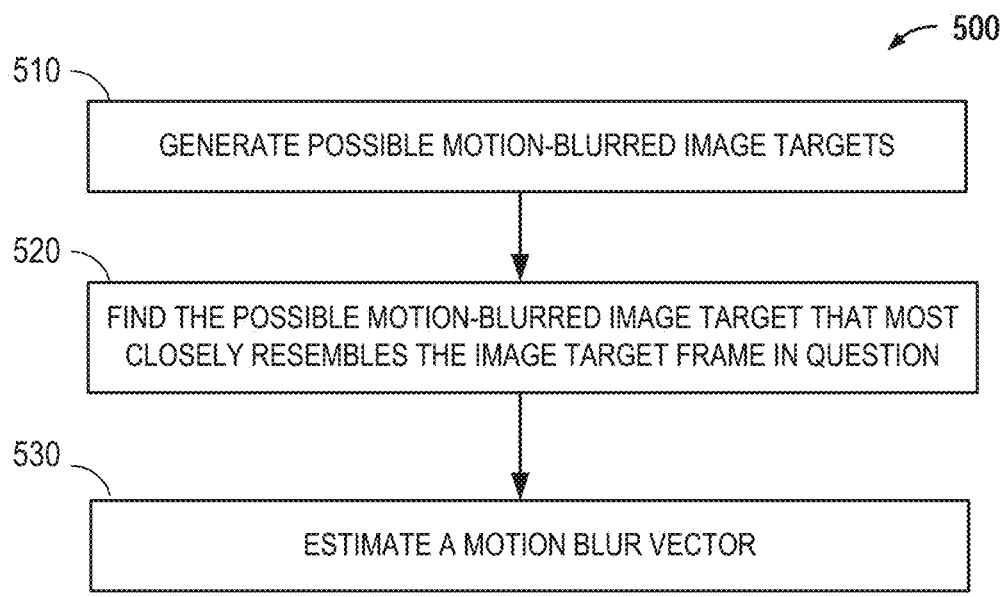
FIG. 5 is a flowchart illustrating an exemplary second motion blur estimation method for estimating a motion blur of an image target.

Referring to FIG. 5, a flowchart illustrating an exemplary second motion blur estimation method 500 for estimating a motion blur of an image target is shown. The second motion blur estimation method 500 may be referred to alternatively as Coarse 3D Estimation. At block 510, a plurality of possible motion-blurred image targets may be generated from an unblurred image target by applying a plurality of blur vectors to the unblurred image target. The plurality of blur vectors may be varied in their directions and magnitudes. For example, in one embodiment, 24 possible motion-blurred image targets may be generated with 24 blur vectors, where the 24 blur vectors cover combinations of 4 directions and 6 magnitudes. In some embodiment, the unblurred image target may be first scaled down before being used to generate possible motion-blurred image targets to reduce computational intensity. For the same reason, in some other embodiments, only a small patch taken around a keypoint on the unblurred image target may be used to generate possible motion blurred image targets. Next, at block 520, the image target frame in question may be compared against the plurality of possible motion-blurred image targets to find the one possible motion-blurred image target that most closely resembles the image target frame in question. Of course, in embodiments where a scaled-down version of the unblurred image target is used to generate the possible motion blurred image targets, the image target frame in question may be similarly scaled down first before the comparisons are made. In embodiments where only a small patch around a keypoint on the unblurred image target is used to generate possible motion blurred image targets, only a small patch around the keypoint on the image target frame in question is used in the comparisons. The similarity between the image target frame in question and any one of the plurality of possible motion blurred image targets may be determined by any known techniques. For example, computing and comparing Normalized Cross-Correlation (NCC) values is one such technique. If the first motion blur estimation method 400 has been performed on the image target frame in question, the motion blur vector derived at block 430 of the first motion blur estimation method 400 may be utilized to optimize the search order at block 520 to conserve computational resources. Thereafter, at block 530, a motion blur vector of the image target frame in question may be estimated as the blur vector associated with the one possible motion-blurred image target found at block 520 to most closely resemble the image target frame in question. It should be appreciated that one way to reduce computational intensity for the second motion blur estimation method 500 when image target frames from a video feed are continuously processed is to compare at block 520 the image target frame in question first with possible motion-blurred image targets less dissimilar with the one found at block 520 in the previous iteration of the second motion blur estimation method 500 before moving on to possible motion-blurred image targets that are more dissimilar.

Figure 6:
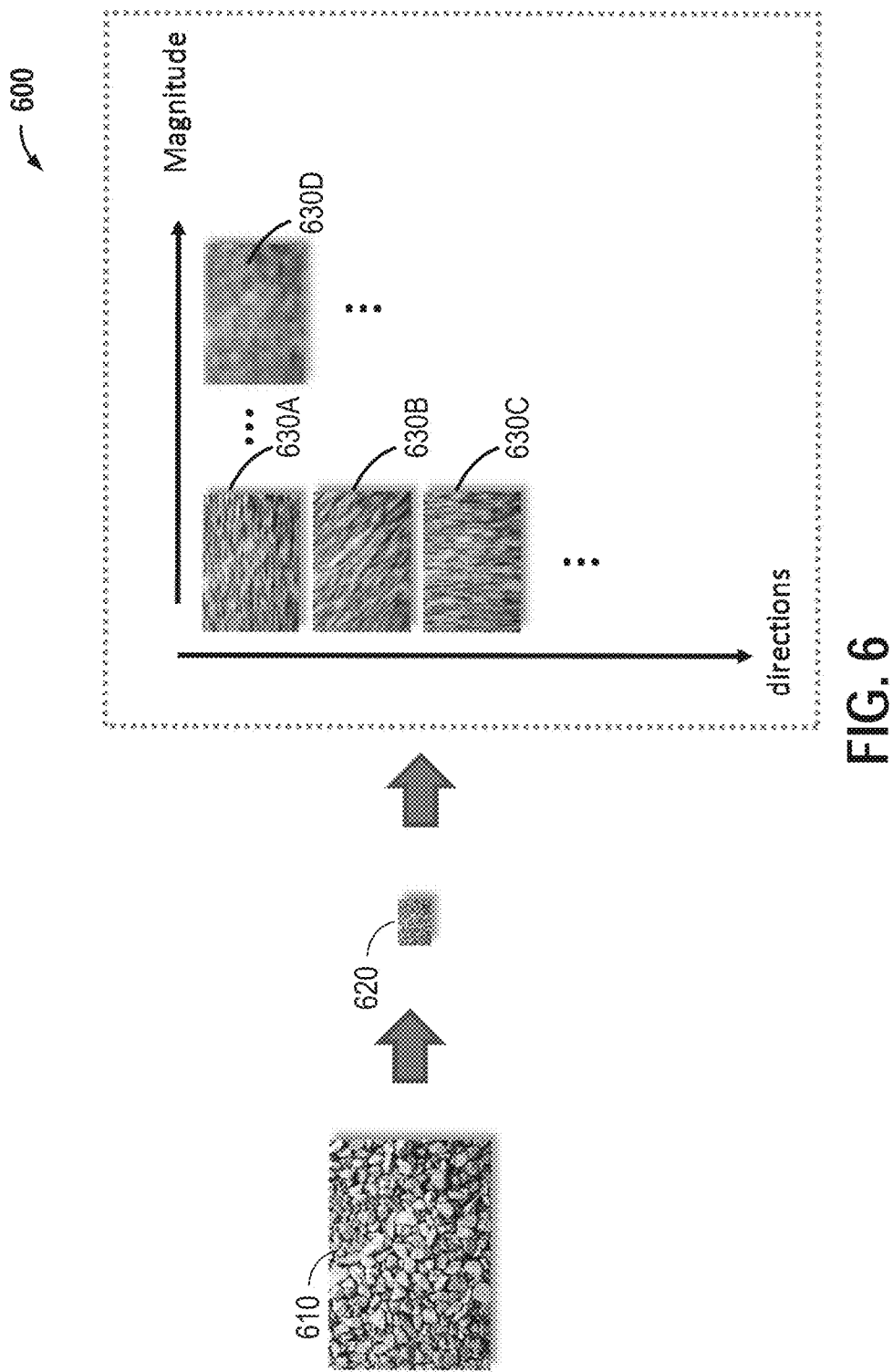
FIG. 6 is an exemplary illustration of the exemplary second motion blur estimation method for estimating a motion blur of an image target.

Referring to FIG. 6, an exemplary illustration 600 of the exemplary second motion blur estimation method 500 for estimating a motion blur of an image target is shown. As described above, with Coarse 3D Estimation, a plurality of possible motion-blurred image targets (e.g., image targets 630A-D) may be generated from an unblurred image target 610 by applying a plurality of blur vectors to the unblurred image target. The unblurred image target 610 may be first scaled down into a scaled-down image target 620 before being used to generate possible motion-blurred image targets (e.g., image targets 630A-D) to reduce computational intensity. Next, the image target frame in question may be compared against the plurality of possible motion-blurred image targets (e.g., image targets 630A-D) to find the one possible motion-blurred image target that most closely resembles the image target frame in question. Thereafter, a motion blur vector of the image target frame in question may be estimated as the blur vector associated with the one possible motion-blurred image target found to most closely resemble the image target frame in question.

Figure 7:
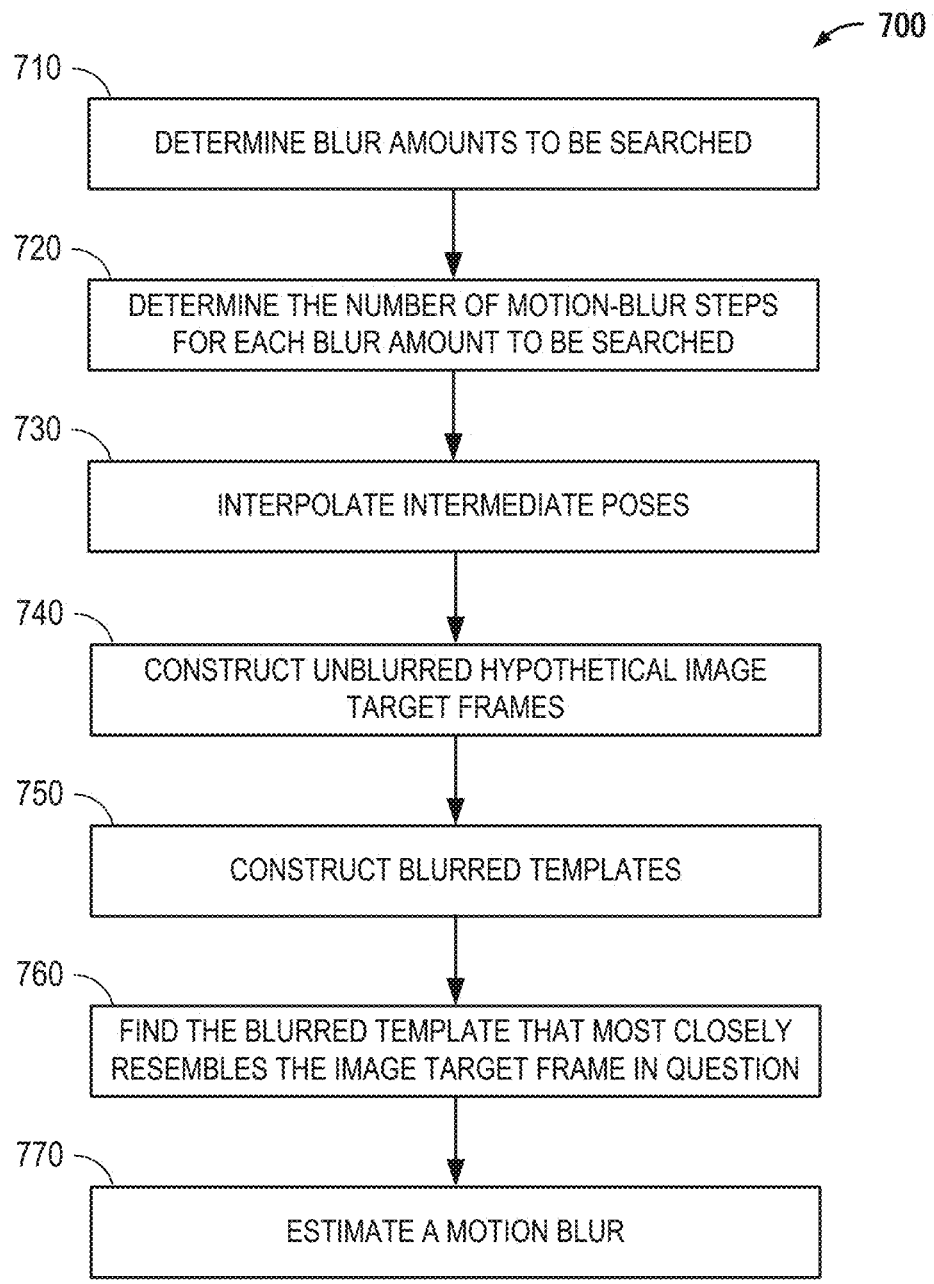
FIG. 7 is a flowchart illustrating an exemplary third motion blur estimation method for estimating a motion blur of an image target.

Referring to FIG. 7, a flowchart illustrating an exemplary third motion blur estimation method 700 for estimating a motion blur of an image target is shown. The third motion blur estimation method 700 may be referred to alternatively as Refined 3D Estimation. At block 710, a plurality of blur amounts to be searched may be determined. If the second motion blur estimation method 500 has been performed on the image target frame in question, the motion blur vector derived at block 530 of method 500 may be used to limit the number of the plurality of blur amounts to be searched. At block 720, for each blur amount to be searched, a number corresponding to the number of motion-blur steps may be determined. The number may be referred to hereinafter as the number N. The number N may be equal to or greater than 1 and may be positively correlated with the corresponding blur amount to be searched. Next, at block 730, one or more intermediate poses between the pose of the image target frame in question and the pose of the image target frame directly before it may be interpolated. The number of intermediate poses may be the same as the number N. The intermediate poses may be evenly spaced between the pose of the image target frame in question and the pose of the image target frame directly before it. At block 740, a plurality of unblurred hypothetical image target frames may be constructed, wherein one hypothetical image target frame may be constructed for each intermediate pose as well as the pose of the image target frame in question and the pose of the image target frame directly before it. At block 750, a plurality of blurred templates may be constructed for each intermediate pose and the pose of the image target frame directly before the image target frame in question. The pose for which a blurred template is constructed may be referred to as the critical pose of the blurred template. A blurred template may be constructed by combining the unblurred hypothetical images target frames corresponding to the critical pose and all the poses after it including all the intermediate poses after the critical pose and the pose of the image target frame in question. In other words, it is assumed that for each blurred template, the motion blur begins to occur at its critical pose. Blocks 720 to 750 may be repeated to obtain all the blurred templates to be searched for all the blur amounts to be searched. Thereafter, at block 760, the image target frame in question may be compared against all the blurred templates to find the single blurred template that most closely resembles the image target frame in question. As with the second motion blur estimation method 500, NCC may be used to measure the similarities between the image target frame in question and the blurred templates. At block 770, a motion blur of the image target frame in question may be estimated as a combination of the blur amount and the critical pose of the blurred template found at block 760 to most closely resemble the image target frame in question. The blur amount may be normalized, for example, to a scale between 0 and 1. It should be appreciated that the motion blur estimate provided by the third motion blur estimation method 700 is more accurate than the second motion blur estimation method 500 because it take into account the 6 degrees of freedom (DOF) of camera movements. It should also be appreciated that the result of Refined 3D Estimation for a current image target frame may be further refined by taking into account the results for previous image target frames and determining the motion blur vector for the current image target frame on an extrapolated curve.

Figure 8:
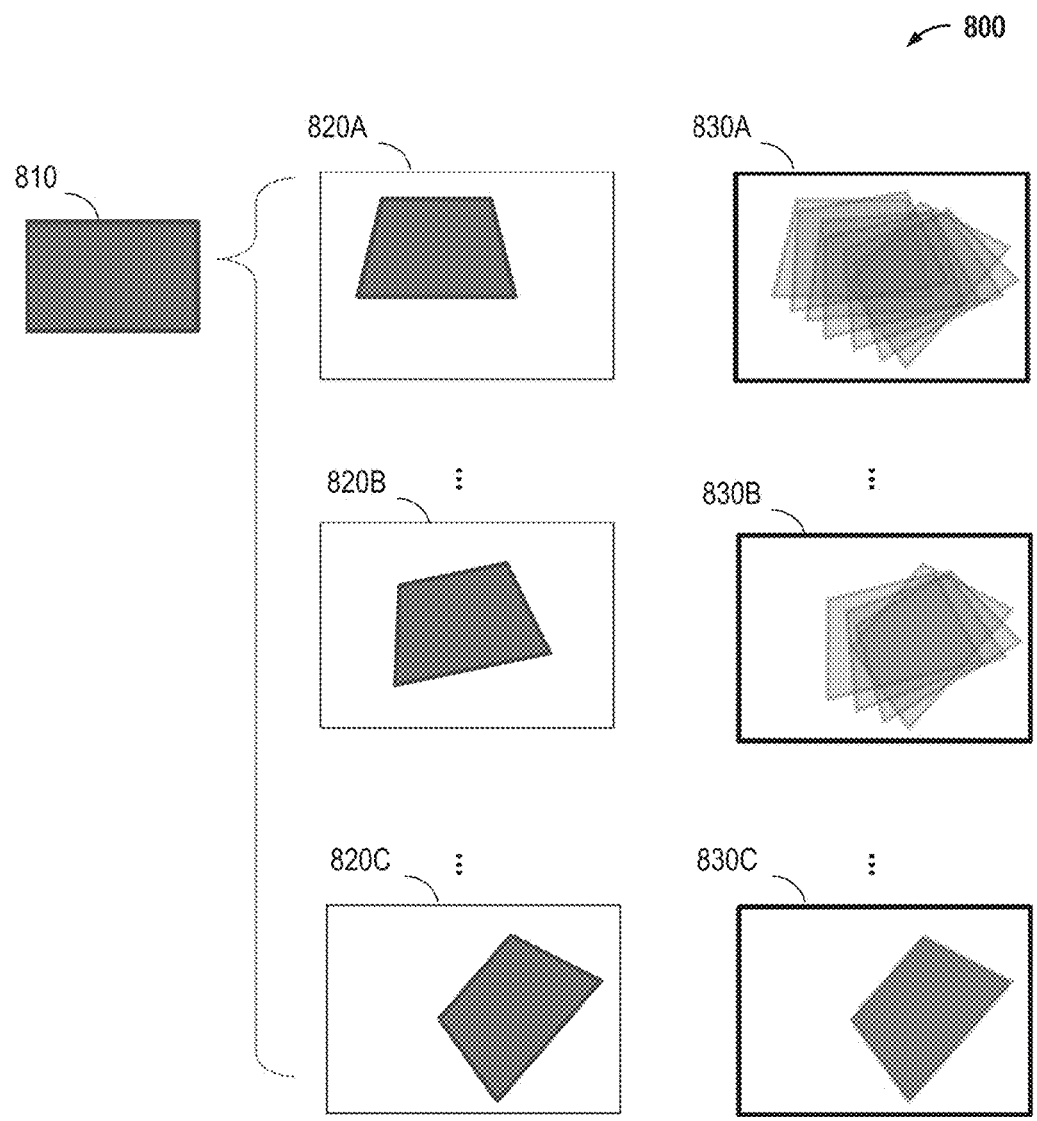
FIG. 8 is an exemplary illustration of the exemplary third motion blur estimation method for estimating a motion blur of an image target.

Referring to FIG. 8, an exemplary illustration 800 of the exemplary third motion blur estimation method 700 for estimating a motion blur of an image target is shown. As described above, with Refined 3D Estimation, a plurality of blur amounts to be searched may be determined. For each blur amount to be searched, a number corresponding to the number of motion-blur steps may be determined. Next, one or more intermediate poses (e.g., pose shown in template 820B) between the pose of the image target frame in question (pose shown in template 820A) and the pose of the image target frame directly before it (pose shown in template 820C) may be interpolated. A plurality of blurred templates (e.g., templates 830A-C) may be constructed for each intermediate pose (e.g., pose shown in template 820 B) and the pose of the image target frame directly before the image target frame in question (pose shown in template 820C). The un-warped (e.g., frontal view) image target 810 may be utilized in the construction of blurred templates. All the blurred templates to be searched for all the blur amounts to be searched may be generated. Thereafter, the image target frame in question may be compared against all the blurred templates (e.g., templates 830A-C) to find the single blurred template that most closely resembles the image target frame in question.

Therefore, it should be appreciated that the third motion blur estimation method 700 (Refined 3D Estimation) is more computationally intensive than the second motion blur estimation method 500 (Coarse 3D Estimation), which in turn is more computationally intensive than the first motion blur estimation method 400 (Fast 2D Estimation). On the other hand, the third motion blur estimation method 700 (Refined 3D Estimation) provides a more accurate blur estimate than the second motion blur estimation method 500 (Coarse 3D Estimation), which in turn provides a more accurate blur estimate than the first motion blur estimation method 400 (Fast 2D Estimation).

As previously described, operations may be performed by the device 100 to: apply a first motion blur estimation method to estimate a motion blur (FIG. 4), determine whether computational resources are available for a second motion blur estimation method, apply the second motion blur estimation method to estimate the motion blur (FIG. 5) in response to a determination that computational resources are available for the second motion blur estimation method, determine whether computational resources are available for a third motion blur estimation method, and apply the third motion blur estimation method to estimate the motion blur (FIG. 7) in response to a determination that computational resources are available for the third motion blur estimation method. Results from a less accurate blur estimation method may be used or reused in the application of a more accurate blur estimation method to save computational resources. For example, the result from the first motion blur estimation method may be used in the application of the second motion blur estimation method, and the result from the first and second motion blur estimation methods may be used in the application of the third motion blur estimation method. Various implementations of three motion blur estimation methods have been previously described in detail. By performing the previously described functions, a device 100 having a processor 110 may execute instructions to operate an Augmented Reality application 145 to adaptively select a most suitable motion blur estimation method to estimate the motion blurs of image target frames, which may be used to simulate motion blurs on a virtual object (virtual teapot 215) to make the virtual object appear more realistically as part of the real-world scene as depicted in the image targets.

It should be appreciated that Augmented Reality application 145 to perform motion blur estimates, as previously described, may be implemented as software, firmware, hardware, combinations thereof, etc. In one embodiment, the previous described functions may be implemented by one or more processors (e.g., processor 110) of a device 100 to achieve the previously desired functions (e.g., the method operations of Figures FIGS. 3-8).

The teachings herein may be incorporated into (e.g., implemented within or performed by) a variety of apparatuses (e.g., devices). For example, one or more aspects taught herein may be incorporated into a general device, a desktop computer, a mobile computer, a mobile device, a phone (e.g., a cellular phone), a personal data assistant, a tablet, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, a wearable device (e.g., watch, head mounted display, virtual reality glasses, etc.), an electronic device within an automobile, or any other suitable device.

In some aspects a wireless device may comprise an access device (e.g., a Wi-Fi access point) for a communication system. Such an access device may provide, for example, connectivity to another network through transceiver (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for adaptively applying one or more motion blur estimation methods to estimate a motion blur associated with an image target frame, comprising:
   applying a first motion blur estimation method to estimate the motion blur;
   determining whether computational resources are available for a second motion blur estimation method after the application of the first motion blur estimation method; and
   applying the second motion blur estimation method to estimate the motion blur in response to a determination that computational resources are available for the second motion blur estimation method.

2. The method of claim 1, wherein the first motion blur estimation method comprises:
   determining a first projected pose by measuring a pose of an image target frame in question and projecting the pose of the image target frame in question to screen space;
   determining a second projected pose by measuring a pose of an image target frame directly before the image target frame in question and projecting the pose of the image target frame directly before the image target frame in question to screen space; and
   estimating a motion blur vector of the image target frame in question by subtracting the second projected pose from the first projected pose.

3. The method of claim 1, wherein the second motion blur estimation method comprises:
   generating a plurality of possible motion-blurred image targets from an unblurred image target by applying a plurality of blur vectors to the unblurred image target;
   comparing an image target frame in question against the plurality of possible motion-blurred image targets to find a single possible motion-blurred image target that most closely resembles the image target frame in question; and
   estimating a motion blur vector of the image target frame in question as the blur vector associated with the single possible motion-blurred image target that most closely resembles the image target frame in question.

4. The method of claim 3, wherein comparing the image target frame in question against the plurality of possible motion-blurred image targets comprises computing a plurality of Normalized Cross-Correlation (NCC) values.

5. The method of claim 1, further comprising:
   determining whether computational resources are available for a third motion blur estimation method; and
   applying the third motion blur estimation method to estimate the motion blur in response to a determination that computational resources are available for the third motion blur estimation method.

6. The method of claim 5, wherein the third motion blur estimation method comprises:
   determining a plurality of blur amounts to be searched;
   determining a number of one or more motion-blur steps for each blur amount to be searched;
   interpolating one or more intermediate poses between a pose of an image target frame in question and a pose of an image target frame directly before the image target frame in question, wherein a number of intermediate poses corresponds to the number of motion-blur steps;
   constructing a plurality of unblurred hypothetical image target frames, wherein one hypothetical image target frame is constructed for each intermediate pose as well as the pose of the image target frame in question and the pose of the image target frame directly before the image target frame in question;
   constructing a plurality of blurred templates for each intermediate pose and the pose of the image target frame directly before the image target frame in question, wherein each blurred template corresponds to a critical pose, which is the pose for which the blurred template is constructed;

comparing the image target frame in question against all the blurred templates to find a single blurred template that most closely resembles the image target frame in question; and estimating a motion blur of the image target frame in question as a combination of the blur amount and the critical pose of the single blurred template found to most closely resemble the image target frame in question.

7. The method of claim 6, wherein comparing the image target frame in question against all the blurred templates comprises computing a plurality of Normalized Cross-Correlation (NCC) values.

8. The method of claim 1, wherein a result of the first motion blur estimation method is used in the application of the second motion blur estimation method.

9. An apparatus for adaptively applying one or more motion blur estimation methods to estimate a motion blur associated with an image target frame, comprising:

a memory; and a processor configured to:

apply a first motion blur estimation method to estimate the motion blur, determine whether computational resources are available for a second motion blur estimation method after the application of the first motion blur estimation method, and apply the second motion blur estimation method to estimate the motion blur in response to a determination that computational resources are available for the second motion blur estimation method.

10. The apparatus of claim 9, wherein the processor configure to apply the first motion blur estimation method is configured to:

determine a first projected pose by measuring a pose of an image target frame in question and projecting the pose of the image target frame in question to screen space, determine a second projected pose by measuring a pose of an image target frame directly before the image target frame in question and projecting the pose of the image target frame directly before the image target frame in question to screen space, and estimate a motion blur vector of the image target frame in question by subtracting the second projected pose from the first projected pose.

11. The apparatus of claim 9, wherein the processor configured to apply the second motion blur estimation method is configured to:

generate a plurality of possible motion-blurred image targets from an unblurred image target by applying a plurality of blur vectors to the unblurred image target, compare an image target frame in question against the plurality of possible motion-blurred image targets to find a single possible motion-blurred image target that most closely resembles the image target frame in question, and estimate a motion blur vector of the image target frame in question as the blur vector associated with the single possible motion-blurred image target that most closely resembles the image target frame in question.

12. The apparatus of claim 11, wherein the processor configured to compare the image target frame in question against the plurality of possible motion-blurred image targets is configured to compute a plurality of Normalized Cross-Correlation (NCC) values.

13. The apparatus of claim 9, wherein the processor is further configured to:

determine whether computational resources are available for a third motion blur estimation method, and apply the third motion blur estimation method to estimate the motion blur in response to a determination that computational resources are available for the third motion blur estimation method.

14. The apparatus of claim 13, wherein the processor configured to apply the third motion blur estimation method is configured to:

determine a plurality of blur amounts to be searched, determine a number of one or more motion-blur steps for each blur amount to be searched, interpolate one or more intermediate poses between a pose of an image target frame in question and a pose of an image target frame directly before the image target frame in question, wherein a number of intermediate poses corresponds to the number of motion-blur steps, construct a plurality of unblurred hypothetical image target frames, wherein one hypothetical image target frame is constructed for each intermediate pose as well as the pose of the image target frame in question and the pose of the image target frame directly before the image target frame in question, construct a plurality of blurred templates for each intermediate pose and the pose of the image target frame directly before the image target frame in question, wherein each blurred template corresponds to a critical pose, which is the pose for which the blurred template is constructed, compare the image target frame in question against all the blurred templates to find a single blurred template that most closely resembles the image target frame in question, and estimate a motion blur of the image target frame in question as a combination of the blur amount and the critical pose of the single blurred template found to most closely resemble the image target frame in question.

15. The apparatus of claim 14, wherein the processor configured to compare the image target frame in question against all the blurred templates is configured to compute a plurality of Normalized Cross-Correlation (NCC) values.

16. The apparatus of claim 9, wherein a result of the first motion blur estimation method is used in the application of the second motion blur estimation method.

17. An apparatus for adaptively applying one or more motion blur estimation methods to estimate a motion blur associated with an image target frame, comprising:

means for applying a first motion blur estimation method to estimate the motion blur;

means for determining whether computational resources are available for a second motion blur estimation method after the application of the first motion blur estimation method; and means for applying the second motion blur estimation method to estimate the motion blur in response to a determination that computational resources are available for the second motion blur estimation method.

18. The apparatus of claim 17, wherein the means for applying the first motion blur estimation method further comprises:

means for determining a first projected pose by measuring a pose of an image target frame in question and projecting the pose of the image target frame in question to screen space;
means for determining a second projected pose by measuring a pose of an image target frame directly before the image target frame in question and projecting the pose of the image target frame directly before the image target frame in question to screen space; and
means for estimating a motion blur vector of the image target frame in question by subtracting the second projected pose from the first projected pose.

19. The apparatus of claim 17, wherein the means for applying the second motion blur estimation method further comprises:
means for generating a plurality of possible motion-blurred image targets from an unblurred image target by applying a plurality of blur vectors to the unblurred image target;
means for comparing an image target frame in question against the plurality of possible motion-blurred image targets to find a single possible motion-blurred image target that most closely resembles the image target frame in question; and
means for estimating a motion blur vector of the image target frame in question as the blur vector associated with the single possible motion-blurred image target that most closely resembles the image target frame in question.

20. The apparatus of claim 19, wherein the means for comparing the image target frame in question against the plurality of possible motion-blurred image targets further comprises means for computing a plurality of Normalized Cross-Correlation (NCC) values.

21. The apparatus of claim 17, further comprising:
means for determining whether computational resources are available for a third motion blur estimation method; and
means for applying the third motion blur estimation method to estimate the motion blur in response to a determination that computational resources are available for the third motion blur estimation method.

22. The apparatus of claim 21, wherein the means for applying the third motion blur estimation method further comprises:
means for determining a plurality of blur amounts to be searched;
means for determining a number of one or more motion-blur steps for each blur amount to be searched;
means for interpolating one or more intermediate poses between a pose of an image target frame in question and a pose of an image target frame directly before the image target frame in question, wherein a number of intermediate poses corresponds to the number of motion-blur steps;
means for constructing a plurality of unblurred hypothetical image target frames, wherein one hypothetical image target frame is constructed for each intermediate pose as well as the pose of the image target frame in question and the pose of the image target frame directly before the image target frame in question;
means for constructing a plurality of blurred templates for each intermediate pose and the pose of the image target frame directly before the image target frame in question, wherein each blurred template corresponds to a critical pose, which is the pose for which the blurred template is constructed;
means for comparing the image target frame in question against all the blurred templates to find a single blurred template that most closely resembles the image target frame in question; and
means for estimating a motion blur of the image target frame in question as a combination of the blur amount and the critical pose of the single blurred template found to most closely resemble the image target frame in question.

23. The apparatus of claim 17, wherein a result of the first motion blur estimation method is used in the application of the second motion blur estimation method.

24. A non-transitory computer-readable medium including code which, when executed by a processor, causes the processor to perform a method comprising:
applying a first motion blur estimation method to estimate a motion blur associated with an image target frame;
determining whether computational resources are available for a second motion blur estimation method after the application of the first motion blur estimation method; and
applying the second motion blur estimation method to estimate the motion blur in response to a determination that computational resources are available for the second motion blur estimation method.

25. The non-transitory computer-readable medium of claim 24, wherein the code for applying the first motion blur estimation method further comprises code for:
determining a first projected pose by measuring a pose of an image target frame in question and projecting the pose of the image target frame in question to screen space;
determining a second projected pose by measuring a pose of an image target frame directly before the image target frame in question and projecting the pose of the image target frame directly before the image target frame in question to screen space; and
estimating a motion blur vector of the image target frame in question by subtracting the second projected pose from the first projected pose.

26. The non-transitory computer-readable medium of claim 24, wherein the code for applying the second motion blur estimation method further comprises code for:
generating a plurality of possible motion-blurred image targets from an unblurred image target by applying a plurality of blur vectors to the unblurred image target;
comparing an image target frame in question against the plurality of possible motion-blurred image targets to find a single possible motion-blurred image target that most closely resembles the image target frame in question; and
estimating a motion blur vector of the image target frame in question as the blur vector associated with the single possible motion-blurred image target that most closely resembles the image target frame in question.

27. The non-transitory computer-readable medium of claim 26, wherein the code for comparing the image target frame in question against the plurality of possible motion-blurred image targets further comprises code for computing a plurality of Normalized Cross-Correlation (NCC) values.

28. The non-transitory computer-readable medium of claim 24, further comprising code for:
determining whether computational resources are available for a third motion blur estimation method; and
applying the third motion blur estimation method to estimate the motion blur in response to a determination that computational resources are available for the third motion blur estimation method.

29. The non-transitory computer-readable medium of claim 28, wherein the code for applying the third motion blur estimation method further comprises code for:
determining a plurality of blur amounts to be searched;
determining a number of one or more motion-blur steps for each blur amount to be searched;
interpolating one or more intermediate poses between a pose of an image target frame in question and a pose of an image target frame directly before the image target frame in question, wherein a number of intermediate poses corresponds to the number of motion-blur steps;
constructing a plurality of unblurred hypothetical image target frames, wherein one hypothetical image target frame is constructed for each intermediate pose as well as the pose of the image target frame in question and the pose of the image target frame directly before the image target frame in question;
constructing a plurality of blurred templates for each intermediate pose and the pose of the image target frame directly before the image target frame in question, wherein each blurred template corresponds to a critical pose, which is the pose for which the blurred template is constructed;
comparing the image target frame in question against all the blurred templates to find a single blurred template that most closely resembles the image target frame in question; and
estimating a motion blur of the image target frame in question as a combination of the blur amount and the critical pose of the single blurred template found to most closely resemble the image target frame in question.

30. The non-transitory computer-readable medium of claim 24, wherein a result of the first motion blur estimation method is used in the application of the second motion blur estimation method.

\* \* \* \* \*